US008947431B2

(12) United States Patent
Li et al.

(10) Patent No.: US 8,947,431 B2
(45) Date of Patent: Feb. 3, 2015

(54) METHOD AND SYSTEM FOR PROVIDING SCENE DATA OF VIRTUAL WORLD

(75) Inventors: Qi Cheng Li, Beijing (CN); Sheng Lu, Beijing (CN); Jian Wang, Beijing (CN); Zi Yu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 13/110,033

(22) Filed: May 18, 2011

(65) Prior Publication Data

US 2011/0285715 A1 Nov. 24, 2011

(30) Foreign Application Priority Data

May 21, 2010 (CN) .......................... 2010 1 0181999

(51) Int. Cl.
*G06T 17/00* (2006.01)
*H04L 29/08* (2006.01)
*H04L 29/06* (2006.01)
*A63F 13/30* (2014.01)

(52) U.S. Cl.
CPC ............... *H04L 67/06* (2013.01); *H04L 69/04* (2013.01); *H04L 67/38* (2013.01); *A63F 13/12* (2013.01); *A63F 2300/534* (2013.01); *A63F 2300/6615* (2013.01)
USPC ....................................................... 345/428

(58) Field of Classification Search
CPC ................................ G06T 17/20; G06T 15/00
USPC ........................................................ 345/428
See application file for complete search history.

(56) References Cited

U.S. PATENT DOCUMENTS

| 5,929,860 | A | * | 7/1999 | Hoppe .......................... 345/419 |
| 6,031,548 | A | * | 2/2000 | Gueziec et al. ............... 345/440 |
| 8,087,274 | B2 | | 1/2012 | Yu |
| 2004/0249617 | A1 | * | 12/2004 | Lau et al. .......................... 703/2 |
| 2006/0161572 | A1 | * | 7/2006 | Vogt et al. ..................... 707/101 |

OTHER PUBLICATIONS

Hoppe, H. (1996). Progressive meshes. ACM Computer Graphics (SIGGRAPH'96), 99-108.*
Hoppe, H., DeRose, T., Duchamp, T., McDonald, J., & Stuetzle, W. (1993). Mesh optimization. ACM Computer Graphics (SIGGRAPH'93), 27, 19-26.*
J. Chim, M. Green, R. W. H. Lau, H. V. Leong, and A. Si, "On caching and prefetching of virtual objects in distributed virtual environments," in Proc. ACM Multimedia, Sep. 1998.*

(Continued)

*Primary Examiner* — Javid A Amini
*Assistant Examiner* — Jin Ge
(74) *Attorney, Agent, or Firm* — Jon A. Gibbons; Fleit Gibbons Gutman Bongini & Bianco PL

(57) ABSTRACT

Methods and systems for providing scene data of a virtual world. One method includes the following steps: receiving a request for downloading the scene data from a content requesting party, where the request includes (i) information on an object group in the scene data and (ii) Level of Detail (LoD) information on an object in the object group, packing LoD content of the object in the object group based on the information on the object group and the LoD information on the object, and transmitting the packed LoD content corresponding to the object group to the content requesting party.

22 Claims, 5 Drawing Sheets

(56) References Cited

OTHER PUBLICATIONS

D. Schmalstieg and M. Gervautz, "Demand-driven geometry transmission for distributed virtual environments," in Proc. Eurographics '96, 1996, pp. 421-432.*

N. Beatrice, S. Antonio, L. Rynson, and L. Frederick, "A Multi-Server Architecture for Distributed Virtual Walkthrough," Proc. ACM Symp. Virtual Reality Software and Technology '02, pp. 163-170, Nov. 2002.*

Yahoo developer network, "Minimize HTTP request" posted on Apr. 16, 2016.*

Simonst, "How to Minimize HTTP Requests to Speed Up Web Pages", posted on Oct. 29, 2009, http://answers.oreilly.com/topic/489-how-to-minimize-http-requests-to-speed-up-web-pages/.*

Chim, et al, "Cyber Walk: A Web-Based Distributed Virtual Walk-Through Environment", IEEE Transactions on Multimedia, vol. 5, No. 4, 2003.

Botev, et al, "The HyperVerse—Concepts for a Federated . . . "3D-Web"", International Journal of Advanced Media and Communications, pp. 331-349, 2008.

Chim, J., et al. "CyberWalk: A Web-Based Distributed Virtual Walkthrough Environment," IEEE Transactions on Multimedia, vol. 5, No. 4, Dec. 2003, pp. 503-515, 1520-9210/03 copyright 2003 IEEE.

Chinese Office Action dated May 2, 2013 for Chinese Application 100101.

* cited by examiner

METHOD AND SYSTEM FOR PROVIDING SCENE DATA OF VIRTUAL WORLD

CROSS-REFERENCE TO RELATED APPLICATION

This application claims priority under 35 U.S.C. §119 from Chinese Patent Application No. 201010181999.6, filed May 21, 2010, the entire contents of which are incorporated herein by reference.

BACKGROUND ART

1. Field of the Invention

The present invention generally relates to a field of information processing technology, and in particular, to a method and system for providing scene data of a virtual world.

2. Related Art

In practical application, downloading methods for scene data have defects including slow data download, non-continual display of scene objects, and other defects that produce a poor user experience. Therefore, there is now a need to overcome the aforementioned one or more defects so that the user has a better use experience.

SUMMARY OF THE INVENTION

One aspect of the present invention provides a method for providing scene data of a virtual world. The method includes the steps of: receiving a request for downloading the scene data from a content requesting party, where the request includes (i) information on an object group in the scene data and (ii) Level of Detail (LoD) information on an object in the object group, packing LoD content of the object in the object group based on the information on the object group in the scene data and the LoD information on the object, and transmitting the packed LoD content corresponding to the object group to the content requesting party.

Another aspect of the invention is another method for providing scene data of a virtual world. The method includes the steps of: transmitting a request for downloading the scene data to a server, where the request includes information on an object group in the scene data and Level of Detail (LoD) information on an object in the object group, and receiving, from the server, packed LoD content corresponding to the object group, where the packed LoD content corresponding to the object group is obtained by packing the LoD content of the object in the object group, based on the information on the object group in the scene data and the LoD information on the object.

Yet another aspect of the present invention is a system for providing scene data of a virtual world. The system includes: downloading request receiving means configured to receive a request for downloading the scene data from a content requesting party, where the request includes (i) information on an object group in the scene data and (ii) Level of Detail (LoD) information on an object in the object group, packing means configured to pack LoD content of the object in the object group based on the information on the object group in the scene data and the LoD information on the object, and transmitting means configured to transmit the packed LoD content corresponding to the object group to the content requesting party.

Yet another aspect of the present invention is another system for providing scene data of a virtual world. The system includes: a resource management module configured to: (a) determine (i) information on an object group in the scene data and (ii) Level of Detail (LoD) information on an object in the object group, and (b) transmit a request for downloading scene data to a server, where the request includes the information on the object group in the scene data and the LoD information on the object in the object group, a downloading management module configured to receive packed LoD content corresponding to the object group, where the packed LoD content corresponding to the object group is obtained by packing the LoD content of the object in the object group based on the information on the object group in the scene data and the LoD information on the object, where the packing is performed by the server.

BRIEF DESCRIPTION OF THE DRAWINGS

Reference is made to the following accompanying drawings for describing, in detail, the features and advantages of embodiments of the present invention. If possible, same or like reference numerals are used to denote same or like parts throughout the drawings and description.

DETAILED DESCRIPTION OF THE PREFERRED EMBODIMENTS

Figure 1:
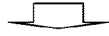
FIG. 1 illustrates a layered downloading process of a scene object of a virtual world according to an embodiment of the invention.
Figure 1:
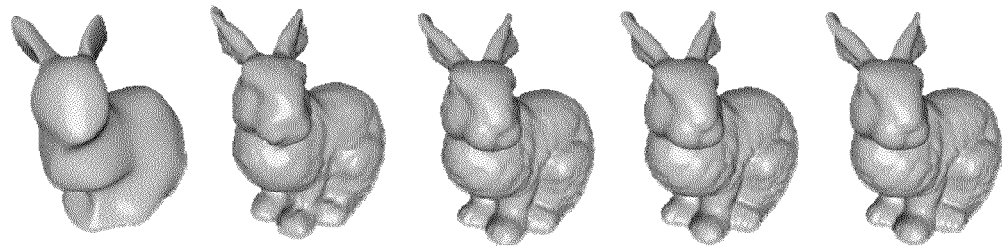

In a virtual world domain related to animation, a 3D game (e.g. the Warcraft game), the network virtual life (e.g. the Second Life), the virtual museum (e.g. the Forbidden City: beyond space and time by IBM), the network virtual shop, and so on, a user needs to download a large amount of data. Two types of data have to be downloaded among them: one type of data relates to an update message, i.e. which type of data needs to be frequently updated, but this data amount is small, generally less than 100 bits, and presents a small load for the client; another type of data is data for constructing scenes, such as an object mesh, an object texture, a terrain, and so on. This type of data is much larger because the data amount of a general scene is up to tens of megabytes. For example, the scene of the Metaverse is 60-80 megabytes, the scene of the World of Warcraft is up to 6.6G bytes, and each scene in the Second Life is 10-30 megabytes. For this type of data, although most of the data can be downloaded at only one time upon installation, if this data relates to a dynamic object, such as a three dimensional object, this data must still be downloaded dynamically.

Table 1 contains some of the main methods for downloading this type of data in a virtual world.

TABLE 1

Data downloading methods

| Method | Advantage | Disadvantage | Applicable Case |
| --- | --- | --- | --- |
| HTTP | Easy user operation | Long time download, broken easily | Small scene data |
| P2P | Fast display | Long time download | Large game |
| Multiple-channel download | Dynamic data are downloaded only on one channel | Multiple channels are not sufficiently utilized | Dynamic virtual world similar to the Second Life |
| HTTP download segmentation material | Multiple segmentation data are downloaded through multiple channels | Over large overhead for TTP/TCP/IP header file | Small dynamic virtual world similar to the Lively |

Since the downloading of virtual scene data is normally a very time-consuming process, a user needs to wait a long time to observe scene information. Specific embodiments of the present application optimize a downloading strategy of the scene data, so the user can see effective information on the scene in a short response time, which improves the user experience. Also, the specific embodiments of the present application employ a packed downloading method for incorporating small package data into large package data, such that a huge amount of redundant header information is reduced to thereby effectively reduce an amount of data transmitted over a network, which improves network transmission efficiency.

Detailed description with reference to the exemplary embodiments is illustrated in the drawings, where the same elements are denoted by the same reference numerals. It should be understood that the present invention is not limited to the exemplary embodiments disclosed herein. It should be also understood that, not every feature of the method and device is necessary for implementing the present invention protected by the claims. Further, in the whole disclosure, when displaying or describing a process or a method, the steps of the method can be performed in any order or simultaneously, unless it is clear from the context that one step depends on another step performed earlier. In addition, there can be significant time intervals between steps.

FIG. 1 illustrates a specific downloading practice for a scene object of a virtual world of the present invention. Where as for the object, in the case where 10% of the scene data corresponding to the object is downloaded, the object rendered according to the 10% of the scene data is already clear enough, and a user can already have a better experience. Thus, the present application provides every Level of Detail (LoD) content of each object based on a gradual partition, enabling the user to see the continuous object with better details without waiting over a long time.

Currently, in the industry, normally a form of triangle mesh is adopted to represent a scene data model of an object. The data in a file includes three dimensional coordinates of a point, texture coordinates (a map between a three dimensional point and a two dimensional point on a texture image), and index values of three points of a triangular mesh. However, none of the current model files in the industry provides a method for Level of Detail (LoD).

There are many studies on a representation method for Level of Detail in the academy, and a method for gradual transmission can be implemented. For example, the doctoral thesis of Lousbery et al., "Multiresolution Analysis for Surfaces of Arbitrary Topological Type," Doctoral Thesis, Dept. of Computer Science and Engineering, U. of Washington, 1994, an article Khodakovsky et al., "Progressive Geometry Compression", published in the SIGGRAPH 2000 conference, and so on, all set forth some methods of gradual transmission, but there is no unified standard.

The present invention provides an applicable scene object data solution suitable for implementing a LoD transmission. Given an example of a three dimensional virtual world, the scene object data generally includes one model file, a plurality of texture files and 0-1 skeleton file, where the model file includes three parts of a header, a base mesh and layered sub-wavelet coefficients data. An exemplary definition of the header of the model file thereof is shown as Table 2.

TABLE 2

| Type | Byte Number | Representation and a detailed meaning |
| --- | --- | --- |
| Int | 4 | Can be represented as Magic ('WAVL'), as verification symbol |
| Int | 4 | Can be represented as L, as a layer number of LoD, where the 0-th layer is the base mesh, sequent lays are sub-wavelet coefficients of the respective level |
| Int | 4 | Can be represented as BVNUM, as a vertex number of the base mesh |
| Int | 4 | Can be represented as BFNUM, as a surface number of the base mesh |
| Int | 4 | Can be represented as BVNUM, as a total number of the vertex number |

In accordance with the above definition, the point number of the base mesh (base function) of a model file and a number of the sub-wavelet coefficients are totally $S=BVNUM*\Sigma_{i=0}^{L}4^i$, where i is a non-negative integer, (where the number of sub-wavelet coefficients correspond to the point number of the model under each LoD level). Since a cyclic subdivision is adopted for the base mesh to increase the level, the point number will increase by four times each time the level is increased by a subdivision. For details, reference can be made to Zorin et al., "Subdivision for Modeling and Animation", the SIGGRAPH 2000 conference.

The base mesh part can consist of triangle sequences, where the specific representation of each triangle is shown as Table 3.

TABLE 3

| Type | Byte number | Detailed meaning |
| --- | --- | --- |
| Int [3] | 4*3 | Three vertices of triangular mesh |

As for the third part of the model file, i.e. a Boolean sequence of the sub-wavelet coefficients, it has a total of S/8 bytes (the Boolean is represented only by one bit because, since one byte is 8 bits, the Boolean sequence of the sub-wavelet coefficients only needs S/8 bytes) to indicate whether the corresponding coefficients exit. The vertex coordinates of the base mesh and the number of the sub-wavelet coefficients equal to the number counting the value of 1 among the Boolean sequence of the sub-wavelet coefficients, and M represents the number obtained by counting the value of 1 among the Boolean sequence of the sub-wavelet coefficients.

Vector3D[M] represents the point coordinates value of the base mesh and the sub-wavelet coefficients of the respective level, as shown in Table 4 (the sub-wavelet coefficients data are represented by a double precision floating point number). Regarding the specific meaning of the sub-wavelet coefficients in the numeral geometry, reference can be made to Dennago et al., "Uplifted Loop Subdivision Wavelets," Computer Graphics and Applications, 12$^{th}$ Pacific Conference (Pacific Graphics), 6-8 October, 2004, page 25.

TABLE 4

| Type | Byte number | Detailed meaning |
| --- | --- | --- |
| Vector3D[M] | M*3*sizeof (double) | Point coordinates value of the base mesh and the sub-wavelet coefficients of the respective level |

A specific model file formed according to the aforementioned data model is shown as Table 5 below.

TABLE 5

| File Header | Base mesh data | Sub-wavelet coefficients of level 1 | Sub-wavelet coefficients of level 2 | Sub-wavelet coefficients of level 3 | ... |
| --- | --- | --- | --- | --- | --- |
| | LoD level 1 | LoD level 2 | LoD level 3 | LoD level 4 | ... |

Figure 2:
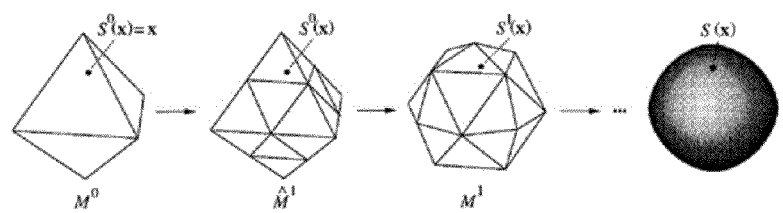
FIG. 2 illustrates a process of constructing, in layers, an object according to an embodiment of the invention.

FIG. 2 schematically illustrates a data model of scene object data that can be used in embodiments of the present invention, where the data model consists of a triangular mesh group (TG). FIG. 2 illustrates mesh models $M^0$, $M^1$, $M^1$ of a sphere, which are represented by different Level of Detail (LoD) respectively, and the final sphere mesh model (FIG. 2 illustrates a process of subdivision increased LoD of the object). It should be noted that the triangular mesh group is only an example used for the data model of the scene object data; in fact, a polygonal mesh group such as a quadrangular mesh group can also be used in the embodiments of the present invention. The aforementioned data model is only illustrative, and can not be construed to limit the present invention. Those skilled in the art can easily construct other LoD data models to implement the present invention based on the present invention.

The scene object data can further include a texture file. The texture file is an image file generally adopting an image format of jpeg, gif, png, and so on, where jpeg has characteristics of gradual transmission. Thus, the texture file can also be considered as being the image file with LoD characteristics. Its file format can refer to: http://www.jpeg.org.

The scene object data can further include a skeleton file. The skeleton file describes a skeleton animation of the model object, which includes two parts: a skeleton system of the model object and a moving sequence of the skeleton. The skeleton animation of the model object is generated based on the moving sequence of the skeleton. The skeleton file does not have the method for gradual transmission, and is downloaded as a whole. It can be considered as the skeleton file only having a content of level 0 LoD. As for construction of the object model in the two dimensional virtual world, those skilled in the art can certainly perform the construct more easily, and this will no longer be repeated herein.

Figure 3:
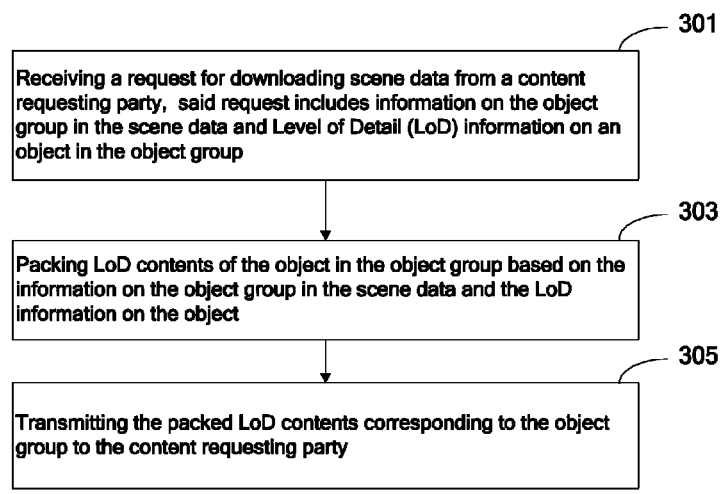
FIG. 3 illustrates an embodiment for providing scene data of a virtual world according to the invention.

As for the virtual world based on, or at least partially based on, the LoD data model, the present invention proposes a first specific embodiment as shown in FIG. 3. In step 301, a request for downloading scene data is received from a content requesting party. The request includes information on each object group in the scene data and Level of Detail (LoD) information on each object in the object group. The objects of the scene data to be downloaded are grouped based on an Area of Interest (AoI), where user's viewpoint is located as shown in FIG. 4, to form the shown object group.

Figure 4:
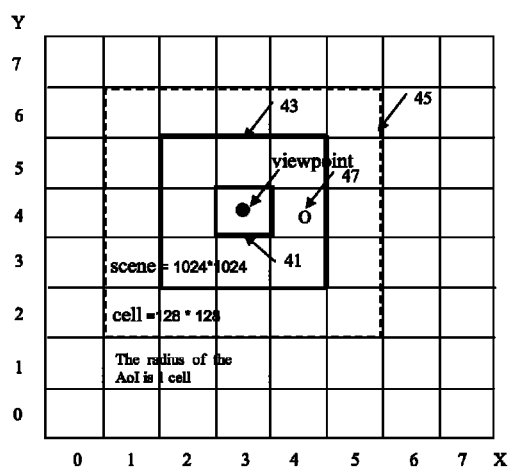
FIG. 4 illustrates an area mesh division of a virtual world, and an area interested by a user.

In the scene model of the virtual world, an area division, as shown in FIG. 4, can be performed (for simplicity, the description is made by using the two dimensional method). For example, when a scene size is 1024*1024 and a size of an equally divided cell area is 128*128, then the scene of the whole virtual world is divided into 64 cell areas. A global unique identifier of each cell area is corresponding X, Y coordinates. For example, the coordinates of an area 41 where the user viewpoint is located is (3, 4). It should be noted that these data are only illustrative, and cannot be construed to limit the present invention.

A radius of the Area of Interest (AoI), including the user viewpoint, can be set as one cell, that is, the areas whose distance to the cell where the current viewpoint is located are the Area of Interest 43, and certainly a plurality of cells can be set as the radius as necessary. Although the scene mesh division in terms of square is provided herein as an example, various shape of mesh division can be adopted.

The location where each object in the scene of the virtual world is located, at anytime, can be recorded by a server; for example, the coordinates of an object O 47 in FIG. 4 in the virtual world are (576, 576), so it can be calculated that object O 47 is inside the cell (4, 4) (if it is a three dimensional representation, then a Z direction coordinate should be added). So it can be determined that the area to be downloaded is the area where the viewpoint is located and the surrounding 8 areas.

A content requesting party (e.g., a client, or a client proxy and so on) can prioritize requesting for downloading the object group formed by the objects included in the area 41, where the viewpoint is located, and then request a one by one, in layer, download of the object groups formed by the objects included in the other surrounding 8 cells according to a clockwise/counter clockwise method. Of course, the objects in the Area of Interest 43 can also be required to be grouped as one object group to be downloaded just once.

The identifier of the object groups can adopt the unique global identifier in the area. For example, an embodiment of the invention can employ area coordinates (x, y) (for three dimensional representation, the Z direction coordinate will be added), and another embodiment of the invention can also adopt an identification information on the object group by combining the unique identifiers of each object. The method which adopts the cell area radius to determine the AoI area can significantly reduce the computation amount of the server, and significantly improve the user's experience. Of course, those skilled in the art can envision various identification methods, priority downloading strategies, and different applicable AoI definitions.

In addition, the content requesting party also provides Level of Detail (LoD) information on the object in the object group in the downloading request, that is, which level of the LoD content of the object is currently required to download.

The area shown by broken lines can be extended in subsequent downloading, if necessary.

More levels of LoD content can be downloaded for the AoI than those for other areas. For example, the $2^{nd}$ level of LoD content is downloaded for the AoI, and the $1^{st}$ level of LoD content is downloaded for the area beyond the broken line, which is helpful because it guarantees a display quality for the user's AoI and it improves the user's experience.

In step 303, the LoD content of the object in the object group is packed according to the information on the object group in the scene data and the LoD information on the object. Since the downloading request of the content requesting party includes the information about the object group in the scene data and the LoD information about the object, each object in the object group and the scene object data corresponding to each object can be found through the information about the object group in the scene data. Additionally, the level of the LoD content of the object that is required to be downloaded can be determined by using the LoD information on the object. All of the obtained LoD contents are packed.

A preferred embodiment where all the LoD contents are packed will be described below in connection with FIG. 5.

In step 305, the packed LoD contents corresponding to the object group are transmitted to the content requesting party. By adopting the first specific embodiment of the present invention, the user is enabled to fluently see a plurality of objects in the scene of the virtual world, rather than the prior art where there are defects such as long waiting time and discontinuously presented objects in the viewed scene.

Figure 5:
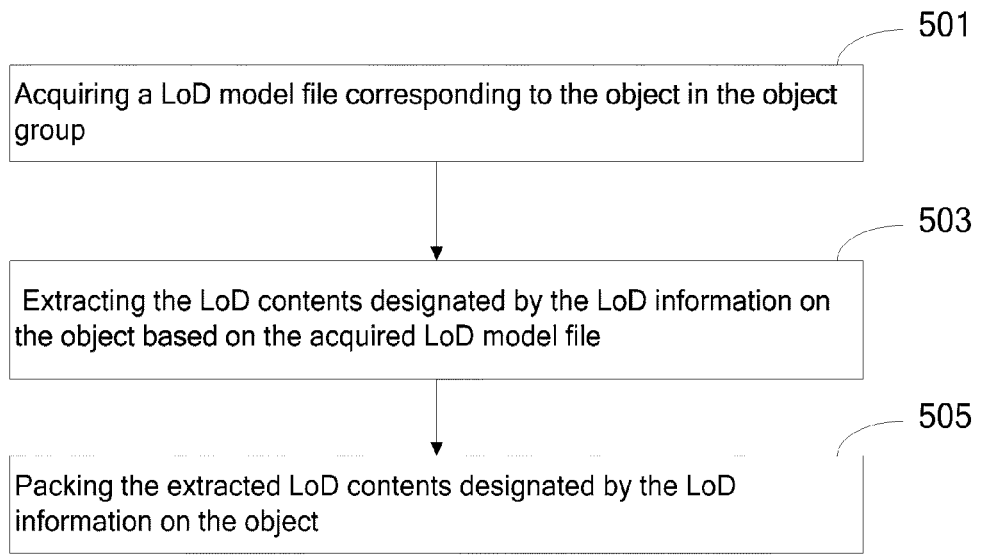
FIG. 5 illustrates an embodiment for providing scene data of a virtual world according to the invention.

FIG. 5 illustrates a second specific embodiment of the present invention, which is a further particular optimization for the above described step 303. In step 501, a LoD model file corresponding to the object of the object group is acquired. Since the content server records the objects included in the current area, if the global identifier of the area is provided in the downloading request from the content requesting party, the LoD model file corresponding to the objects can be retrieved based on the records. If the downloading request directly provides the unique identifiers of a plurality of objects to the content server, then the LoD model file corresponding to the objects can be retrieved directly based on the unique identifiers of these objects.

In step 503, the LoD content designated by the LoD information on the object is extracted based on the acquired LoD model file. The LoD model file adopts a layered method to record the scene data of the object according to the LoD information on the object, i.e. which layer of the LoD content is required. The data block of LoD content of the layer is extracted from the LoD model file of the scene object data.

In step 505, the extracted LoD content designated by the LoD information on the object is packed. In the prior art, it is apt to respectively pack the aforementioned plurality of LoD contents into a plurality of HTTP packages to be sent to the user, so that there are a lot of overheads of headers.

Figure 6:
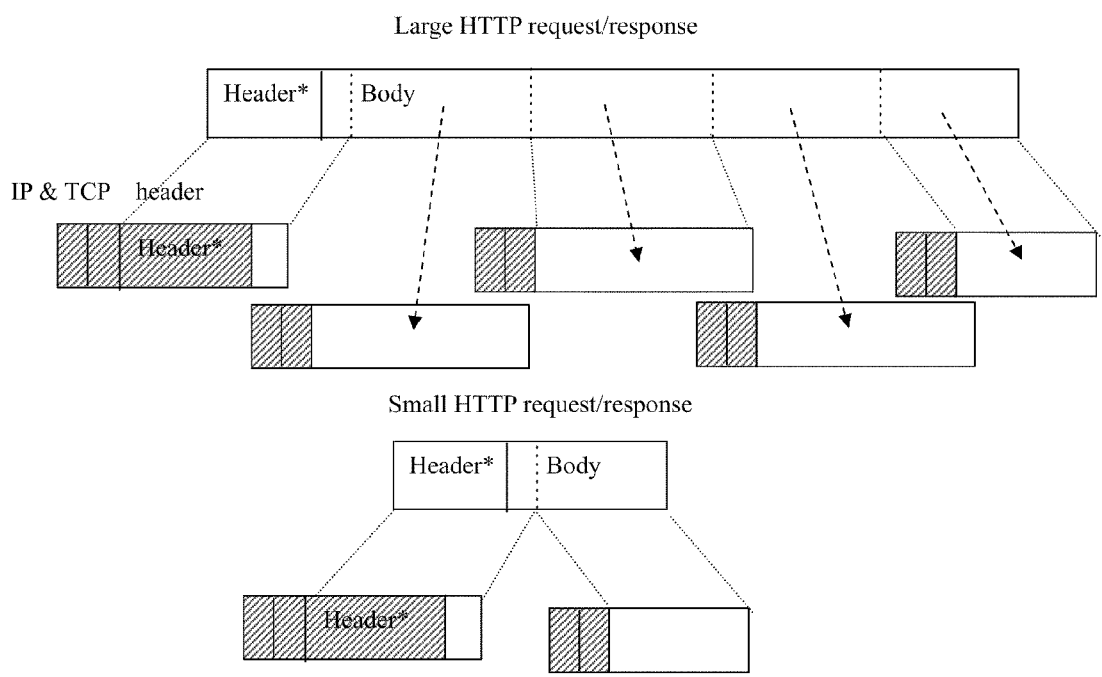
FIGS. 6 and 7 illustrate a preferred packing method according to the invention.
Figure 7:
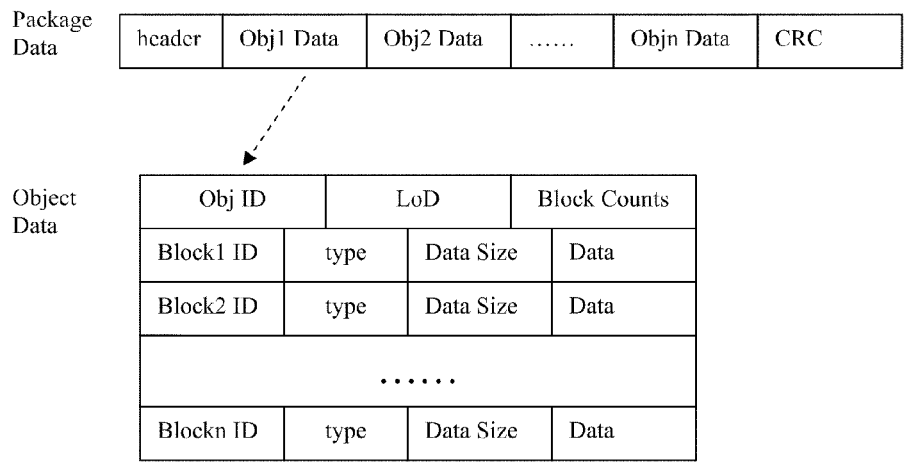

FIGS. 6 and 7 illustrate a preferred packing method for the present invention. Unlike the prior art, and as shown in FIG. 6, the present invention packs the aforementioned plurality of LoD contents into a large HTTP package to be sent to the user, so that a lot of overhead of headers is saved.

FIG. 7 illustrates a data format of a formed package, where the packed data is a package data which includes three parts of data: a header recording an ID of the package data (a version number, a size (byte number) of the whole package data, and counts containing the scene objects), middle data recording the object data of each scene (Obj1 data, Obj2 data, . . . ), and a CRC checking code. The object data of each scene can include three kinds of data: one model data, one or more texture data, and 0-1 skeleton data. The object data of the scene is the following data in order:

Object ID (Obj ID): a data with a fixed size;
Level of Detail (LoD) information: a data with a fixed size;
Block counts included in the object data: a data with a fixed size;
The following are data blocks in order; each data block includes the following data:
Data block ID: a data with a fixed size;
Data type: model data, texture data or skeleton data, a data with a fixed size;
Data size in bytes of the data block: a data with a fixed size;
Actual data of the data block, variable data, and the size is the byte number given by the last data end.
The aforementioned package data is only illustrative, and it can not be construed as the specific limitation to the present invention.

As a preferred embodiment, a unique package data identifier can be generated for the above package data, and sent to the content requesting party. The content requesting party receives the unique identifier of the package data, and requests that the package data be downloaded, the content server sends to the content requesting party the packed LoD content corresponding to the object group according to the request. By employing this method, the content requesting party can avoid a situation of an idle wait, while waiting for packing after sending the downloading request. This is helpful because it improves the utilizing efficiency of the content requesting party.

Figure 8:
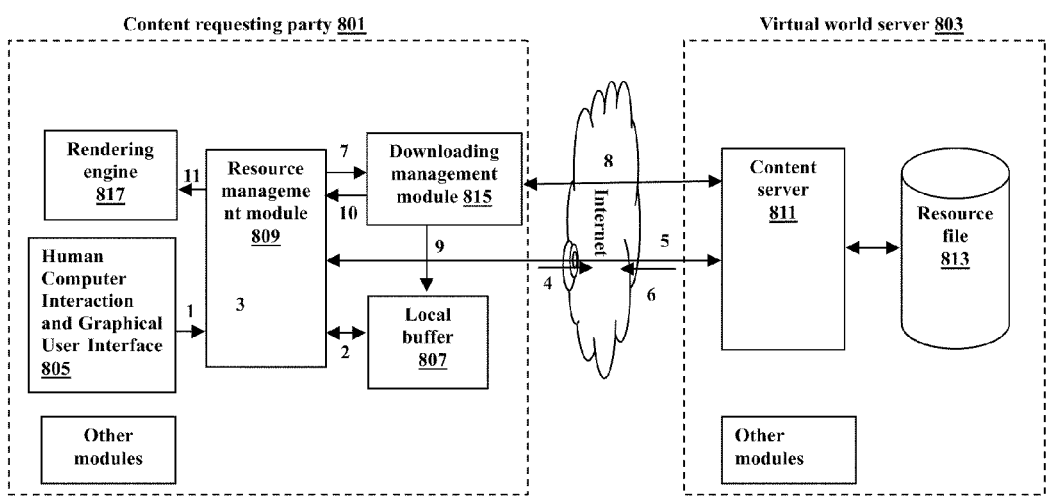
FIG. 8 illustrates an embodiment for providing scene data of a virtual world according to the invention.
Figure 9:
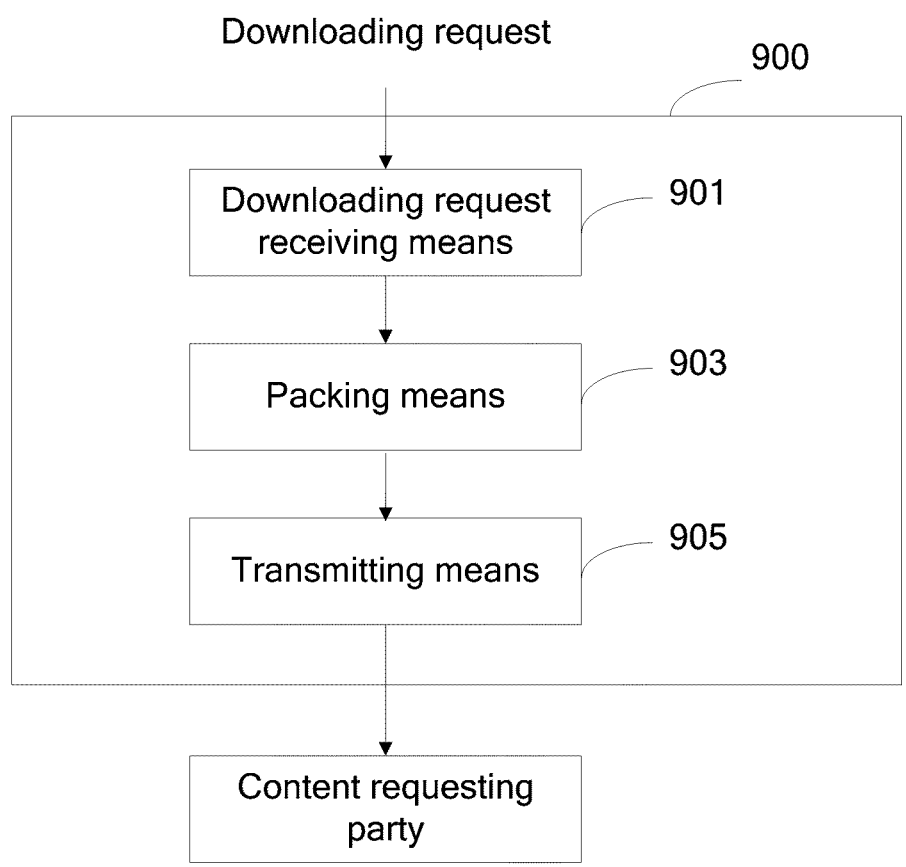
FIG. 9 illustrates an embodiment for providing scene data of a virtual world according to the invention.

FIG. 8 illustrates a third specific embodiment in connection with a system for providing scene data of a virtual world of the present invention. A whole method flow and system of the present invention are described in detail below.

As shown by arrow 1, a resource management module of a client receives a downloading request formed by a list of a scene object group, which is sent by a Human Computer Interaction and Graphical User Interface module based on a user's viewpoint.

As shown by arrow 2, the resource management module 809 of the content requesting party 801 checks whether a local buffer 807 has resource files of these scene objects, then scene objects having resource files locally will be deleted from the list of a scene group in the downloading request. In a step 3, the content requesting party 801 initiates computation of the downloading strategy. There are many methods for the downloading strategy; for example, generating a list of an object group including a scene object according to the aforementioned concept of the Area of Interest (AoI) and the Level of Detail (LoD), then sorting according to a distance between a cell of Area of Interest (AoI) and the viewpoint. A cell with a close distance can be placed at a front of the list, otherwise at a back of the list, or simply downloading the surrounding cells of the Area of Interest (AoI) in accordance with the clockwise direction, and so on. Those skilled in the art can choose any suitable downloading strategy based on the present application.

As shown by arrow 4, the content requesting party 801 sends to a virtual world server 803 the downloading request regarding the object group, including the scene object required to be downloaded in priority in the list. The downloading request includes identification information on the object group and Level of Detail (LoD) information on the object in the object group.

As shown by arrow 5, the virtual world server 803 receives the downloading request, and a content service module 811 of the virtual world server 803 finds from a resource database 813 corresponding file data for packing. The method for packing can be based on the various implementing methods illustrated above. As shown by arrow 6, the virtual world server 803 generates a unique identifier for the packed data and sends it to the content requesting party 801, and meanwhile informs that the downloading is available.

Proceeding to a step as shown by arrow 7, the resource management module 809 of the content requesting party 801 receives the unique identifier of the packed data, and forwards to a downloading management module 815 to start the downloading task.

In the step as shown by arrow 8, the content requesting party 801 starts downloading the packed data. The downloading process can be multiple threads to download a plurality of packed data, and can also perform the downloading by using the methods such as HTTP, FTP, TCP/IP.

In a step, as shown by arrow 9, the content requesting party 801 can parse the downloaded content after part of the contents have been downloaded without waiting for the whole contents to be completely downloaded; certainly, it can also perform the parsing after the whole package has been completely downloaded. If a low Level of Detail representation data is found in the local buffer 807, current data (such as the LoD content of the current level) and previous data (such as the LoD content of other level) are combined to generate new data, and the parsed data or the combined data are stored in the local buffer 807. Since the sent packed data use the data structure as shown in FIG. 7, the parsing in the content requesting party 801 can be carried out according to the following method:

1) First, reading the header, determining how many objects' scene object data are included in the packed LoD content corresponding to the object group;

2) sequentially reading the LoD content of the scene object data of each object:
 a) reading the scene object ID;
 b) reading the Level of Detail (LoD) of the scene object data;
 c) reading the data block counts contained in the scene object;
 d) sequentially reading the data block data:
  i. reading a data block ID;
  ii. reading the data block type, if it is model data, it proceeds to the processing flow of model data; if it is texture data, it proceeds to the processing flow of texture data; if it is skeleton data, it proceeds to the processing flow of skeleton data;
  iii. reading the data size in bytes of the data block;
  iv. reading as much data as the bytes designated in the above step, and then performing the corresponding type of process according to the type of the data block.

The present invention is not limited to the above parsing method, and of course, those skilled in the art can also conceive other implementing method for parsing based on the present invention.

Proceeding to a step as shown by arrow 10, after the new data are generated, the resource management module 809 can be informed to update data, and then, as shown by arrow 11, a rendering engine 817 performs plotting based on the new data, so as to present the scene object of the related virtual world to the user.

Another aspect of the present invention also provides a system 900 for providing scene data of a virtual world. The system 900 includes a downloading request receiving means 901, a packing means 903 and a transmitting means 905, where the downloading request receiving means 901 is for receiving a request for downloading scene data from a content requesting party, and the request includes information on an object group in the scene data and Level of Detail (LoD) information on an object in the object group; the packing means 903 is for packing LoD contents of the object in the object group based on the information on the object group in the scene data and the LoD information on the object; and the transmitting means 905 is for transmitting the packed LoD contents corresponding to the object group to the content requesting party, where the information on the object group includes a global identifier of the object group in the virtual world, where the LoD information on the object in the object group includes LoD contents of the object at which level is required to be downloaded.

Preferably, the scene data of the object includes a LoD model file, the packing means 903 includes: means for retrieving the LoD model file corresponding to the object in the object group; means for extracting the LoD contents designated by the LoD information on the object based on the retrieved LoD model file; means for packing the extracted LoD contents corresponding to the object group.

Preferably, the means for packing the extracted LoD contents corresponding to the object group includes: means for forming the extracted LoD contents into a package data, where the package data includes a header and an object data, the header records counts of objects included in the object group, and the object data of the object in the object group includes the LoD contents corresponding to the object.

Preferably, the scene object data of the object also includes at least one of a texture file and a skeleton file, where the texture file includes the LoD contents.

Preferably, the transmitting means 905 includes: means for transmitting a unique identifier of the package data formed by the packed LoD contents to the content requesting party; means for, in response to the request for downloading the package data by the content requesting party according to the received unique identifier of the package data, transmitting the packed LoD contents corresponding to the object group to the content requesting party.

Preferably, the object group includes objects in a user's Area of Interest (AoI), the object in the object group includes a three dimensional dynamic object, the system further includes means for determining the user's AoI by a way of using a cell area radius of the virtual world.

In addition, the method and system for providing scene data of the virtual world according to the present invention can also be implemented by a computer program product, which includes a software code part executed to implement a simulation method for the present invention when the computer program product is operated in a computer.

The present invention can also be implemented by a computer program recorded in a computer-readable recording medium, and the computer program includes a software code part executed to implement a simulation method for the present invention when the computer program product is operated in a computer. That is, the process according to the simulation method for the present invention can be distributed in the form of instructions in the computer-readable medium and in various other forms, regardless of the particular type of the signal bearing medium actually used to perform the distribution. Examples of the computer-readable medium include the medium such as an EPROM, a ROM, a magnetic tape, a paper, a floppy disk, a hard disk driver, a RAM and a CD-ROM, and a transmission type media such as a digital and analog communication link.

While the present invention has been shown and described in detail with reference to the preferred embodiments of the present invention, it should be understood by those skilled in the art that various changes in form and detail can be made therein without departing from the spirit and scope of the invention as defined by the appended claims.

What is claimed is:

1. A method for providing scene data of a virtual world, the method comprising:
   receiving a request for downloading said scene data from a content requesting party, wherein said request includes (i) information on an object group in said scene data and (ii) Level of Detail (LoD) information on an object in said object group, wherein scene data of said object includes a LoD model file corresponding to said object in said object group;
   packing LoD content of said object in said object group based on said information on said object group in said scene data and said LoD information on said object by:
      acquiring said LoD model file corresponding to said object,
      extracting said LoD content designated by said LoD information on said object using said acquired LoD model file, and
      packing, into a single HTTP package to be sent to said content requesting party, said extracted LoD content designated by said LoD information on said object by forming said extracted LoD content into a package data, wherein said package data includes a header and an object data, wherein said header records counts of objects in said object group, and wherein said object data comprises data of said object in said object group; and
   transmitting said packed LoD content corresponding to said object group to said content requesting party, wherein said transmitting further comprises:
      transmitting a unique identifier of a package data to said content requesting party, wherein said package data is formed by said packed LoD content; and
      responding to a request for downloading said package data by transmitting said packed LoD content corresponding to said object group to said content requesting party, wherein said request is made by said content requesting party, and wherein said request is made according to said unique identifier.

2. The method according to claim 1, wherein said scene data of said object further comprises a texture file that includes said LoD content.

3. The method according to claim 1, wherein said object group includes objects in an Area of Interest (AoI) of a user, and wherein said object in said object group includes a three dimensional dynamic object.

4. The method according to claim 3, wherein said AoI of a user is determined by using a cell area radius of said virtual world.

5. The method according to claim 1, wherein said LoD information on said object in said object group includes information on LoD content of said object at a level required for download.

6. The method according to claim 1, wherein said information on said object group includes a global identifier of said object group in said virtual world.

7. The method according to claim 6, wherein said global identifier of said object group in said virtual world is coordinates of a cell area of said virtual world where said object in said object group is located.

8. A non-transitory computer readable storage medium having executable programming instructions stored thereon which, when implemented, cause a computer to carry out the steps of the method according to claim 1.

9. The method according to claim 1, wherein said header records an ID of the packaged data, the ID including a version number, and a number of bytes of the packaged data.

10. The method according to claim 1, wherein said data of said object in said object group includes:
    an object ID;
    level of detail information; and
    a count of data blocks included in the object data; and
    with a data type selected from a plurality of data types including model data, textural data, and skeleton data.

11. A method for providing scene data of a virtual world, the method comprising:
    transmitting a request for downloading said scene data to a server, wherein said request includes (i) information on an object group in said scene data and (ii) Level of Detail (LoD) information on an object in said object group; and
    receiving, from said server, packed LoD content corresponding to said object group, wherein said packed LoD content corresponding to said object group is obtained by packing said LoD content of said object in said object group based on said information on said object group in said scene data and said LoD information on said object, wherein scene data of said object includes a LoD model file corresponding to said object in said object group, and wherein said packing includes:
       acquiring said LoD model file corresponding to said object,
       extracting said LoD content designated by said LoD information on said object using said acquired LoD model file, and
       packing, into a single HTTP package to be sent to said content requesting party, said extracted LoD content designated by said LoD information on said object by forming said extracted LoD content into a package data, wherein said package data includes a header and an object data, wherein said header records counts of objects in said object group, and wherein said object data comprises data of said object in said object group
       wherein said receiving, from said server, packed LoD content corresponding to said object group further comprises:
          requesting said server to download said package data based on a unique identifier, wherein said request is made in response to receiving said unique identifier of said package data, and wherein said package data is formed by packing said LoD content of said object group in said object group transmitted by said server; and
          receiving said packed LoD content corresponding to said object group transmitted by said server.

12. The method according to claim 11, wherein said downloading request includes an object group list of said scene determined according to a viewpoint of a user, and the method further comprises:
    checking whether a local buffer has resource files of an object in an object group in said object group list;
    deleting an object of said scene having a local resource from an object group in said object list;
    determining a downloading priority order for said object group in said list according to a predetermined downloading strategy; and
    generating said request for downloading said scene data according to said downloading priority order.

13. The method according to claim 11 further comprising:
    determining an amount of scene data corresponding to objects in said object group that is included in said packed LoD content corresponding to said object group;

sequentially reading LoD content of scene data of each object in said object group; and performing a scene rendering based on said sequential reading.

14. The method according to claim 11 further comprising:
determining an amount of scene data corresponding to objects in said object group that is included in said packed LoD content corresponding to said object group;
sequentially reading LoD content of scene data of each object in said object group; and
performing a scene rendering based on said sequential reading.

15. A non-transitory computer readable storage medium having executable programming instructions stored thereon which, when implemented, cause a computer to carry out the steps of the method according to claim 11.

16. The method according to claim 11, wherein said data of said object in said object group includes:
an object ID;
level of detail information; and
a count of data blocks included in the object data; and
with a data type selected from a plurality of data types including model data, textural data, and skeleton data.

17. A system for providing scene data of a virtual world, the system comprising:
memory with computer instructions stored therein;
a processor communicatively coupled to the memory and configured to execute the computer instructions to perform:
receiving a request for downloading said scene data from a content requesting party, wherein said request includes (i) information on an object group in said scene data and (ii) Level of Detail (LoD) information on an object in said object group;
packing LoD content of said object in said object group based on said information on said object group in said scene data and said LoD information on said object, wherein scene data of said object includes a LoD model file corresponding to said object in said object group, and wherein said packing includes:
retrieving said LoD model file corresponding to said object,
extracting said LoD content designated by said LoD information on said object based on said retrieved LoD model file, and
packing, into a single HTTP package to be sent to said content requesting party, said extracted LoD content by forming said extracted LoD content into a package data, wherein said package data includes a header and an object data, wherein said header records counts of objects included in said object group, and wherein said object data of said object in said object group includes said LoD content corresponding to said object; and
transmitting said packed LoD content corresponding to said object group to said content requesting party, wherein said transmitting further comprise:
transmitting a unique identifier of a package data formed by said packed LoD content to said content requesting party; and
responding to a request for downloading said package data by transmitting said packed LoD content corresponding to said object group to said content requesting party,
wherein said request is made by said content requesting party, and wherein said request is made according to said unique identifier.

18. The system according to claim 17, wherein scene data of said object also includes a texture file that includes said LoD content.

19. The system according to claim 17, wherein said object group includes objects in an Area of Interest (AoI) of a user, wherein said object in said object group includes a three dimensional dynamic object, and wherein said system further comprises determining said AoI of a user by using a cell area radius of said virtual world.

20. The system according to claim 17, wherein said data of said object in said object group includes:
an object ID;
level of detail information; and
a count of data blocks included in the object data; and
with a data type selected from a plurality of data types including model data, textural data, and skeleton data.

21. A system for providing scene data of a virtual world, the system comprising:
memory with computer instructions stored therein;
a processor communicatively coupled to the memory and configured to execute the computer instructions to perform:
(a) determining (i) information on an object group in said scene data and (ii) Level of Detail (LoD) information on an object in said object group, and
(b) transmitting a request for downloading scene data to a server,
wherein said request includes said information on said object group in said scene data and said LoD information on said object in said object group; and
receiving packed LoD content corresponding to said object group, wherein said packed LoD content corresponding to said object group is obtained by packing said LoD content of said object in said object group based on said information on said object group in said scene data and said LoD information on said object, wherein said packing includes:
acquiring said LoD model file corresponding to said object,
extracting said LoD content designated by said LoD information on said object using said acquired LoD model file, and
packing, into a single HTTP package to be sent to said content requesting party, said extracted LoD content designated by said LoD information on said object by forming said extracted LoD content into a package data, wherein said package data includes a header and an object data, wherein said header records counts of objects in said object group, and wherein said object data comprises data of said object in said object group wherein said packing is performed by said server; and
transmitting said packed LoD content corresponding to said object group to said content requesting party, wherein said transmitting further comprises:
transmitting a unique identifier of a package data to said content requesting party, wherein said package data is formed by said packed LoD content; and
responding to a request for downloading said package data by transmitting said packed LoD content corresponding to said object group to said content requesting party, wherein said request is made by said content requesting party, and wherein said request is made according to said unique identifier.

22. The system according to claim 21, wherein said data of said object in said object group includes:
an object ID;
level of detail information; and
a count of data blocks included in the object data; and
with a data type selected from a plurality of data types including model data, textural data, and skeleton data.

* * * * *